No. 733,577. PATENTED JULY 14, 1903.
G. H. CATT.
WHEEL FOR BOOT FINISHING MACHINES.
APPLICATION FILED DEC. 9, 1902.
NO MODEL.
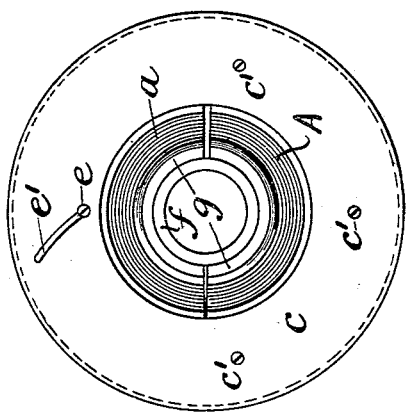
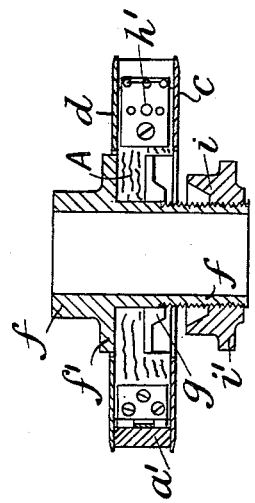
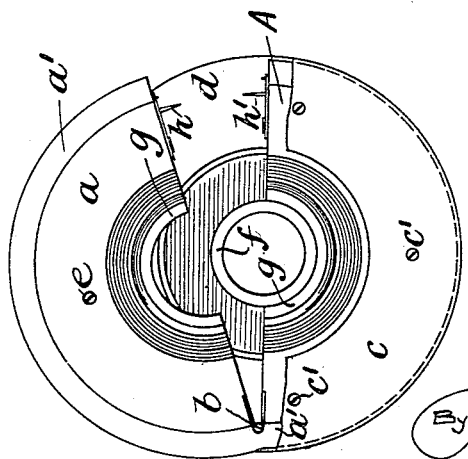
WITNESSES
H. M. Kuehne
J. M. Dowling
INVENTOR
George Henry Catt
By Richards
ATTORNEYS.

No. 733,577. Patented July 14, 1903.

UNITED STATES PATENT OFFICE.

GEORGE HENRY CATT, OF HYTHE, ENGLAND.

WHEEL FOR BOOT-FINISHING MACHINES.

SPECIFICATION forming part of Letters Patent No. 733,577, dated July 14, 1903.

Application filed December 9, 1902. Serial No. 134,546. (No model.)

*To all whom it may concern:*

Be it known that I, GEORGE HENRY CATT, manufacturer, a subject of the King of England, residing at Villa Amalthea, Hythe, in the county of Southampton, England, have invented a certain new and useful Improvement in Wheels for Boot-Finishing Machines, of which the following is a full, clear, and exact description.

This invention relates to the wheels of boot-finishing machines, which are provided at the periphery with a strip of emery-cloth or other scoring material. This strip is secured upon the periphery by being held between the fixed portion and an outwardly-movable portion of the periphery of the wheel.

The present invention consists of a locking device for securing this outwardly-movable portion to the fixed portion of the wheel.

It comprises, essentially, a male cone formed upon the wheel, a portion of this cone being movable outwardly with the movable portion of the periphery, and a female cone screwed upon the sleeve or bush of the wheel and adapted to engage and retain the male cone, thereby locking the parts of the wheel together.

The invention is illustrated upon the accompanying sheet of drawings, upon which—

Figure 1 is a side view of the wheel with the female cone removed, the parts of the wheel being in the closed position. Fig. 2 is a side view of the wheel showing the movable part of the wheel opened outwardly and part of the front cheek-plate removed. Fig. 3 is a longitudinal section of the sleeve or bush, taken at the meeting faces of the wheel mounted thereon and showing also in section the female cone screwed on the boss.

The wheel A is fitted with an outwardly-movable portion $a$, hinged to A at $b$. This wheel is shown formed of a wooden frame or disk surrounded by a felt layer $a'$. The strip of glass-paper, emery-cloth, or like scoring material is secured upon this felt layer $a'$ in the usual manner.

Upon each side of the wheel A is secured a fixed cheek-plate or guard-plate $c$ $d$ in the form of a ring. These are shown screwed to the fixed part of the wheel A by screws $c'$. The movable part of the periphery $a$ moves between these cheek-plates $c$ $d$, and in this portion of the cheek-plates pins or screws $e$ may be provided, traveling in slots $e'$, in which case the movement of the movable part $a$ is limited.

The wheel is mounted on a sleeve or bush $f$, the fixed half A being screwed or otherwise secured to a flange or collar $f'$, fast to said sleeve. By means of this sleeve the wheel may be secured on a shaft in any ordinary manner. This sleeve $f$ is therefore fast to the fixed part A, and a male cone $g$ is formed upon the nave or hub of this wheel, (when in the closed position,) embracing the sleeve $f$. The cone $g$, it will be seen from Fig. 2, is thus in two pieces—one secured to the fixed part A and the other to the movable part $a$ of the wheel. The cone $g$ is sunk in a recess in the side of the wheel and is shown upstanding from the base of said recess. Pins $h$ $h'$ are provided upon the meeting-faces of the parts A $a$, on which the strip of scoring material may be impaled. These pins enter sockets in the opposite faces, as will be perceived from Fig. 3. On the sleeve $f$, which for a portion of its length is screw-threaded for that purpose, is screwed a female cone $i$, having a milled edge $i'$, by which it may be rotated. This cone $i$ is adapted to engage the cone $g$ when the parts of the wheel A $a$ are brought together. The cone $i$ being screwed up and along the sleeve $f$ partly incloses or embraces the cone $g$, as will be evident from Fig. 3, and consequently the movable part $a$ of the wheel is locked to the fixed part A and the strip of scoring material stretched tightly upon the periphery of the felt underlayer $a'$. This double cone-locking arrangement forms a neat and easily-operated device and being central of the wheel can be actuated from any point.

Having thus described my invention, what I claim as such, and desire to secure by Letters Patent, is—

1. A wheel for boot-finishing machines comprising a fixed half and an outwardly-movable half secured thereto, said wheel being mounted on a sleeve, annular cheek-plates upon the sides of said wheel, a central recess in one side of the wheel, a male cone on the hub of the wheel and upstanding in the recess thereof, said cone being formed partly on the fixed half and partly on the movable half, and a female cone adjustably movable on said sleeve and capable of entering said recess and engaging said male cone.

2. A wheel for boot-finishing machines comprising a fixed half and an outwardly-movable half, said movable half being secured thereto, said wheel being mounted on a sleeve and provided with annular cheek-plates, transverse slots in said cheek-plates and pins from said movable half of the wheel entering said slots, a male cone on the hub of the wheel, said cone formed partly on the fixed half and partly on the movable half of the wheel, and a female cone adjustably movable on the said sleeve and capable of engaging and partly inclosing said male cone.

3. A wheel for boot-finishing machines comprising a fixed half and an outwardly-movable half hinged thereto, said wheel being mounted on a sleeve, said sleeve projecting on each side of the wheel and being in part screw-threaded, said fixed half of the wheel being made fast to a flange on said sleeve, a central recess in one side of the wheel, annular cheek-plates on the sides of said wheel, oblique slots in said cheek-plates, said slots retaining pins upstanding from said movable half of the wheel, a male cone on the hub of the wheel, and seated in said central recess, said cone being formed partly on the fixed half and partly on the movable half of the wheel, and a female cone screw-threaded correspondingly to said sleeve adjustably movable on said sleeve and capable of engaging and partly inclosing said male cone.

In witness whereof I have hereunto set my hand in presence of two witnesses.

GEORGE HENRY CATT.

Witnesses:
VICTOR F. FEENY,
GEO. W. WHITTON.